US005672311A

United States Patent [19]
May et al.

[11] Patent Number: 5,672,311
[45] Date of Patent: Sep. 30, 1997

[54] PROCESS FOR PREPARING THERMOSET COMPOSITE ARTICLES

[75] Inventors: Clayton A. May, Watsonville, Calif.; Walter V. Breitigam, Katy; Ronald S. Bauer, Houston, both of Tex.

[73] Assignee: Shell Oil Company, Houston, Tex.

[21] Appl. No.: 859,636

[22] Filed: Mar. 20, 1992

Related U.S. Application Data

[63] Continuation of Ser. No. 769,516, Oct. 1, 1991, abandoned, which is a continuation of Ser. No. 477,381, Feb. 9, 1990, abandoned.

[51] Int. Cl.$^6$ .................................................. B29B 17/00
[52] U.S. Cl. ........................... 264/347; 264/101; 264/137
[58] Field of Search ................................ 264/101, 103, 264/236, 347, 137

[56] References Cited

U.S. PATENT DOCUMENTS

| | | | |
|---|---|---|---|
| 2,044,579 | 6/1936 | Kuettel et al. | 264/347 |
| 2,875,474 | 3/1959 | Lauterbach et al. | 264/137 |
| 3,024,492 | 3/1962 | Antolino | 264/347 |
| 4,007,245 | 2/1977 | Scola | 264/102 X |
| 4,680,341 | 7/1987 | Newman-Evans | 525/113 |
| 4,692,291 | 9/1987 | Angell | 264/102 X |
| 4,786,668 | 11/1988 | Dewhirst | 523/445 |
| 4,786,669 | 11/1988 | Dewhirst | 523/445 |
| 4,804,740 | 2/1989 | Gardner et al. | 528/422 |
| 4,808,461 | 2/1989 | Boyer et al. | 428/119 |
| 4,851,280 | 7/1989 | Gupta | 428/246 |
| 4,861,810 | 8/1989 | Dewhirst | 523/445 |
| 4,882,370 | 11/1989 | Jordan et al. | 523/215 |

OTHER PUBLICATIONS

Enns and Gilham, *J. Applied Polymer Science*, 28, pp. 2567–2591 (1983).

Gillham, 3rd International Conference on Crosslinked Polymers, May 29–31 (1989), pp. 119–138.

Gillham, "Formation And Properties of Thermosetting and High Tg System" pp. 125–126.

*Primary Examiner*—Merrick Dixon

[57] ABSTRACT

A process for preparing thermoset composite articles under relatively mild conditions includes exposing a laminate containing a partially-cured thermosettable resin and a fibrous substrate to an elevated temperature which increases over time, the elevated temperature being below the glass transition temperature of the resin but sufficient to promote further curing and increase the glass transition temperature thereof to the ultimate glass transition temperature of the resin. The temperature of exposure is generally increased at a rate which maintains the temperature within about 20° C. below the glass transition temperature of the thermoset-table resin, so that cure of the resin proceeds in the glassy state. The pressure during the process is generally maintained below about 50 psi and is preferably atmospheric pressure. The process enables the production of thermoset composite articles suitable for high-performance applications without lengthy autoclave treatments.

26 Claims, No Drawings

PROCESS FOR PREPARING THERMOSET COMPOSITE ARTICLES

This is a continuation of application Ser. No. 769,516, filed Oct. 1, 1991, now abandoned, which was a continuation of Ser. No. 477,381, filed Feb. 9, 1990, now abandoned.

BACKGROUND OF THE INVENTION

Fiber-reinforced thermosettable resins are converted to high-performance shaped objects, such as aircraft structures, through a number of manufacturing steps. Most manufacturing processes begin with a shaped, resin-saturated fibrous mass and involve the application of heat, pressure and vacuum, in a series of stages, to remove air and volatiles, cure the resin, and consolidate the resin and fiber mass into a void-free composite structure.

Some composites are fabricated at room temperature under vacuum. However, high-strength structural composites for uses requiring retention of properties at high temperature are fabricated at high temperature and pressure in a press or autoclave. Autoclaves are widely used, as they can accomodate high-pressure and vacuum processing of either a number of small parts or a large structure such as an airplane wing or fuselage.

Autoclaves for carrying out high-temperature fabrication processes involving both pressure and vacuum during various stages of the fabrication process are expensive, and their cost must be amortized as part of the fabrication cost. The simplest autoclave processes typically require 3–6 hours plus cooling time. A more typical autoclave process involves heating the resin-saturated fibrous mass, usually under vacuum, to a hold temperature above the Tg of the partially-cured resin maintained for an hour or more. During this period, the viscosity of the resin is low and cure progresses slowly, permitting the removal of voids and volatiles and consolidation of the resin/fiber mass. Pressures of 100 psi or more are then typically applied and the prepreg is heated to an elevated temperature near the ultimate glass transition temperature of the resin and maintained for two hours or more to effect final cure and consolidation. Total autoclave time for such high-temperature, high-pressure processes is typically 4–8 hours and requires the constant attention of an operator, adding to the cost of the fabrication process.

It is therefore an object of the invention to provide a relatively simple, low-cost process for preparing a high-performance reinforced thermoset composite. In one aspect, it is an object of the invention to permit reduction of autoclave time in the preparation of high-performance thermoset composites.

BRIEF SUMMARY OF THE INVENTION

According to the invention, a process is provided for preparing a thermoset composite article under relatively mild conditions. The process comprises exposing a laminate comprising a partially-cured thermosettable resin and a fibrous substrate to an elevated temperature which increases over time, which elevated temperature is below the glass transition temperature of the partially-cured resin but is sufficient to further cure the resin and thus increase the glass transition temperature thereof to a point at or near the ultimate glass transition temperature of the cured resin. The temperature of exposure is generally increased at a rate which maintains the temperature within about 20° C. below the glass transition temperature of the thermosettable resin. The process is continued until the ultimate glass transition temperature of the resin system has been achieved. The pressure during the cure process is generally maintained below about 50 psi. For many composite formulations, the process can be carried out in an oven at atmospheric pressure. The process offers the advantage of relatively low cost, compared with conventional high-pressure autoclave processes.

DETAILED DESCRIPTION OF THE INVENTION

The invention process involves the low-pressure cure of a thermosettable resin component of an article comprising a thermosettable resin and a fibrous substrate. The thermosettable resin is ideally one which cures in the "glassy" state at a temperature at or below its glass transition temperature (Tg). As used herein, the "glass transition temperature" of a thermosettable resin is the temperature at which there is an abrupt change in elastic modulus with heating of the resin, as measured by dynamic mechanical analysis (DMA).

Particularly suitable thermosettable resins for use in the invention process are epoxy resin systems which form stable glassy solids well below their ultimate glass transition temperature, preferably at or near room temperature. Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater

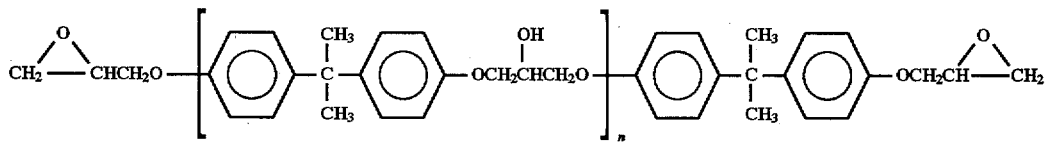

(I)

than 0, commonly in the range of 0 to 10, preferably in the range of 0 to 2. An example of a suitable epoxy resin component is EPON® Resin 1123, a brominated diglycidyl ether of bisphenol-A having a molecular weight of about 800. A preferred epoxy resin for composites fabrication is the diglydicyl ether of 9,9-bis(4-hydroxyphenyl)fluorene (uncured Tg approximately 52° C.) available as EPON HPT® 1079 from Shell Chemical Company. Also suitable as the epoxy resin component are multifunctional glycidyl ethers of tetraphenol ethane, as represented below in structure II. Such multi-functional epoxy

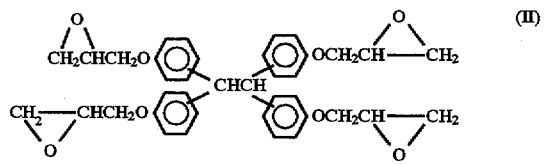

(II)

resins are available commercially as EPON® Resin 1031 from Shell Chemical Company. Other suitable resins can be prepared by the reaction of epichlorohydrin with mononuclear di- and trihydroxy phenolic compounds such as resorcinol and phloroglucinol, selected polynuclear polyhydroxyphenolic compounds such as bis(p-hydroxyphenyl) methane and 4,4'-dihydroxybiphenyl, or aliphatic polyols such a 1,4-butanediol and glycerol.

The epoxy resin component of the composite can include novolac-based epoxy resins ("novolac epoxy resins"), which are the glycidyl ethers of the product of reacting a phenol, such as phenol, cresol, resorcinol or bisphenol-A, with formaldehyde in acid solution. An example of a suitable class of bisphenol-A novolac epoxy resins is represented below in structure III.

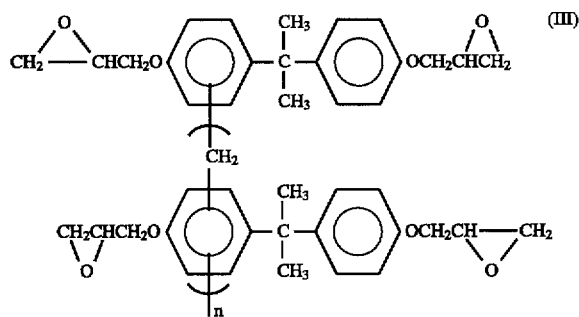

The epoxy resin component for use in the invention process can also be a glycidated aromatic amine including those which can be represented by the formula

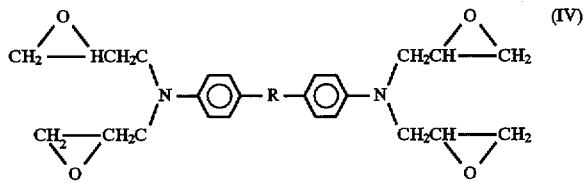

wherein R is a substituted or unsubstituted alkyl, aryl, aralkyl or alkaryl group and the like, including furandiyl. The aromatic rings can contain substituents such as $C_{1-10}$ alkyl and halide. Such glycidyl amines include tetraglycidyl-4,4'-diaminodiphenylmethane; tetraglycidyl-α,α'-bis(4-aminophenyl)-p-diisopropylbenzene, a solid tetraglycidyl amine having a glass transition temperature (uncured) of 23° C.; and tetraglycidyl-α,α'-bis(3,5-dimethyl-4-aminophenyl)-p-diisopropylbenzene, a solid tetraglycidyl amine having a glass transition temperature (uncured) of 41° C.

Such polyglycidyl aromatic amines can be prepared by reacting the corresponding polyaromatic amine with epichlorohydrin. The polyaromatic amine can be prepared by reacting the corresponding aniline with diisopropenylbenzene or its precursor bis(hydroxyisopropylbenzene) in the presence of hydrochloric acid or acid clay catalyst.

Other thermosettable resins, alone and in combination with epoxy resins, can be processed into composites by the invention process. Such thermosettable resins include, for example, cyanate esters, bisbenzocyclobutenes, propargyl ethers, and vinyl esters, and blends of such resins with epoxy resins. Highly suitable thermosettable resins for composites include imides such as bismaleimides and trismaleimides. Preferred bismaleimides include N,N'-bisimides of unsaturated carboxylic acids which can be represented by the formula

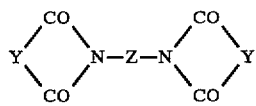

in which Y is a substituted or unsubstituted divalent radical containing at least 2 carbon atoms, preferably 2 to 6 carbon atoms, and a carbon-carbon double bond, and Z is a divalent radical containing at least 1, generally about 1 to about 40 carbon atoms. Z can be aliphatic, cycloaliphatic, aromatic or heterocyclic. A preferred class of bismaleimides is derived from an aromatic diamine and can be represented by the formula

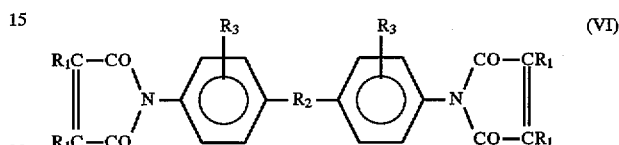

in which each $R_1$ is selected independently from H, $C_{1-2}$ alkyl or halide; $R_2$ is selected from divalent hydrocarbon radicals containing from about 1 to about 6 carbon atoms, —O—, —SO$_2$—, —COO—, —CONH—, —CO— and —S—S—; and each $R_3$ is selected independently from H, $C_{1-3}$ alkyl and halide.

Examples of such bismaleimides include
N,N'-4,4'-methylene-bis-maleimide
N,N'-4,4'-ethylene-bis-maleimide
N,N'-hexamethylene-bis-maleimide
N,N'-meta-phenylene-bis-maleimide
N,N'-p-phenylene-bis-maleimide
N,N'-4,4'-diphenylmethane-bis-maleimide
N,N'-4,4'-diphenylether-bis-maleimide
N,N'-4,4'-diphenylsulphone-bis-maleimide
N,N'-4,4'-dicyclohexylmethane-bis-maleimide
N,N'-4,4'-(3,5-diphenylpyridine)-bis-maleimide
N,N'-pyridinidi-2,6-Y-bis-maleimide
N,N'-α,α'-4,4'-dimethylenecyclohexane-bis-maleimide
N,N'-meta-xylelene-bis-maleimide
N,N'-4,4'-diphenylcyclohexane-bis-maleimide
N,N'-meta-phenylene-bis-dichloromaleimide
N,N'-4,4'-diphenylmethane-bis-citraconimide
N,N'-4,4'-(1,1-diphenylpropane)bis-maleimide
N,N'-4,4'-(1,1,1-triphenylethane)bis-maleimide
N,N'-4,4'-triphenylmethane-bis-maleimide
N,N'-3,5-(1,2,4-triazole)bis-maleimide,
and various N,N'-bismaleimides disclosed in U.S. Pat. Nos. 3,562,223, 4,211,860 and 4,211,861. Bismaleimides can be prepared by methods known in the art, such as described in U.S. Pat. No. 3,018,290, for example. The imide can also be a trifunctional maleimide reaction product of a bis (aminobenzyl)aniline with maleic anhydride.

For composites applications, the imide will preferably be blended with an epoxy resin in an amount within the weight ratios of 1:9 to 9:1, preferably about 1:1 to about 9:1.

An epoxy resin-containing composition will include a curing agent. Effective curing agents for epoxy resins are known to include, for example, amines, acids, anhydrides, phenols and imidazoles. The preferred curing agents for imparting strength and high temperature resistance to epoxies are substituted or unsubstituted aromatic amines, preferably aromatic diamines and triamines such as, for example, methylene dianiline, m-phenylene diamine, α,α'-bis(3,5-dimethyl-4-aminophenyl)-p-diisopropylbenzene, α,α'-bis(3-ethyl-5-methyl-4-aminophenyl)-p-diisopropylbenzene, and diaminodiphenylsulfone. The curing agent will be present in the composition in an amount effective to promote cure of the thermosettable resin, generally about 0.5 to about 1.5 equivalents per equivalent of the resin.

Thermosettable resin-containing compositions may optionally include such additives as cure accelerators; tackifiers; and impact modifiers such as carboxy-terminated butadiene/acrylonitrile copolymers, thermoplastics and thermoplastic elastomers. Suitable accelerators include ureas, tertiary amines, imidazoles, phosphenes, octoates and boron trifluorides. Any accelerator will be present in the composition in an amount effective to increase the cure rate and/or lower the cure temperature of the composition, generally in an amount from about 0.01 to about 7, preferably from about 0.05 to about 3 weight percent, based on the weight of the thermosettable resin.

The thermosettable resin composition can include an optional solvent, such as a ketone, alcohol or glycol ether, for example. A resin-containing solution with a curing agent and optional accelerator make up the "varnish" or laminating composition. The initial stage of composites preparation is generally preparation of a "prepreg." For preparation of a prepreg, a fibrous substrate of glass, carbon, quartz, polyethylene, poly(p-phenylene-terephthalamide), polyester, polytetrafluoroethylene, poly(p-phenylenebenzobisthiazole), boron, paper or like material, in chopped, mat or woven form, is impregnated with the varnish or a molten resin system. The prepreg is formed by heating the impregnated substrate in an oven at a temperature sufficient to evaporate the solvent and partially cure without gellation, or "B-stage," the resin, generally about 40° to about 200° C., preferably about 150° to about 190° C., for a time up to about 10 minutes, preferably about 30 seconds to about 2 minutes.

A laminate is fabricated by subjecting a set of layered prepregs to conditions effective to cure the resin and to integrate the prepregs into a laminated structure. The prepreg (or layered prepregs in a laminate structure) is, after optional formation into a desired shape, heated under conditions effective to form a dense, void-free structure and to increase the Tg of the resin to a temperature at or above room temperature. This preliminary heating step will generally be carried out under a vacuum and will, depending upon the resin system used and the composite properties sought, be effected in a press, vacuum bag, mold or autoclave.

In the practice of the invention composites fabrication process, it is optional but preferred to carry out this laminate consolidation stage under relatively mild conditions. The unconsolidated laminate is thus preferably heated under vacuum to a temperature above the glass transition temperature, but substantially below the ultimate Tg, of the resin system. This preliminary treatment is generally carried out by gradually heating the laminate from about room temperature to a temperature within the range of about 75° to about 150° C., generally about 110° to about 140° C., and holding at this temperature for a time of up to about one hour.

It may be desirable to apply pressure above atmospheric to the laminate during this consolidation stage. Preferably, any applied pressure is maintained below about 150 psi, most preferably below about 100 psi. If pressure is required to achieve laminate consolidation, this stage of the composites fabrication process will be carried out in a press or autoclave for a time sufficient to further cure the resin and to consolidate the laminate into an integral, void-free structure. The total autoclave time for this consolidation step will vary depending upon the resin system used but will, for greatest economy and convenience, be kept below about 3 hours, preferably within the range of about 0 to about 1.5 hours. If the resin system and other conditions are such that pressure above atmospheric is not required, this stage will most conveniently be carried out in a vacuum bag at atmospheric pressure. It is important to note that, although the invention curing process described below is relatively mild and does not require autoclave time, the consolidation stage of laminate treatment is not made more rigorous and, in fact, the preferred method of practicing the invention composites fabrication process includes a relatively mild consolidation stage with little or no autoclave time (e.g., relatively short time under high pressure). The Tg of the resin system after laminate consolidation is somewhat above the partially-cured Tg of the resin system in the prepreg state but substantially below the ultimate Tg of the resin system.

The consolidated laminate can then be cooled to room temperature or below for storage under conditions which inhibit further cure of the resin pending final fabrication of the laminate into a cured composite structure by the invention process, if desired, or it can be directly passed to an oven for the curing step. For free-standing oven cure of a formed laminate structure, the laminate will generally be cooled to a temperature at which structural integrity of the laminate is maintained after removal of the tooling and prior to start of the cure cycle. In the invention curing process, the laminate is exposed to an elevated temperature which is effective to bring about further cure of the resin but is below its advancing Tg. This temperature of exposure is increased over time (as the Tg of the resin system advances) but maintained below the Tg of the resin system, preferably within about 20° C. below Tg, most preferably within about 2° to about 12° C. below Tg. The temperature increase can be in a series of stages or can be essentially continuous over the cure cycle. Such a process can be carried out in a temperature-programmable oven, for example, in a continuously-increasing temperature cycle or in a series of ramped heating stages below the advancing Tg. In the preferred fabrication process, the laminate is formed into its desired shape in the consolidation step and the tooling is then removed, so that oven cure of free-standing composites hardware is effected in the curing step.

As is known, the Tg of a thermosettable resin increases with the degree of cure of the resin and is to some extent dependent upon the particular curing agent used. As used herein, "thermosettable resin system" means the thermosettable resin(s) along with any curing agents, accelerators and other components of the composition which may affect the cure behavior of the resin(s). By "Tg" is meant the glass transition temperature of the thermosettable resin system in its current cure state. As the laminate is exposed to heat in the invention process, the resin undergoes further cure and its Tg increases, requiring a corresponding increase in the curing temperature to which the prepreg is exposed. The ultimate, or maximum, Tg of the resin is the point at which essentially complete chemical reaction has been achieved. "Essentially complete" reaction of the resin has been achieved when no further reaction exotherm is observed by differential scanning calorimetry (DSC) upon heating of the resin. The ultimate Tg can thus be determined by dynamic mechanical analysis (DMA) for any given resin system. It is this glass transition temperature which is the objective in the fabrication of a high-performance composite article.

The nature of this heating treatment will depend upon the resin system used and the size of the formed laminate but is preferably carried out by increasing the temperature of exposure of the laminate at a rate within the range of about 0.1° to about 2° C. per minute. The heat treatment can be effected at or near atmospheric pressure, preferably within the range of about 0 to about 50 psi, most preferably about 10 to about 30 psi. The curing step will generally require at least about an hour, with length of treatment very dependent upon the particular resin system.

The laminate can optionally be subjected to a post-cure heat treatment in an oven at or near the ultimate Tg, generally within about 30° C. of the ultimate Tg, for a time of about 0 to about 10 hours, generally about 2 to 4 hours.

The practice of the invention composites fabrication process offers the advantages of simpler and less expensive processing of thermosettable laminates. The primary savings is in the reduced autoclave time permitted by the low-temperature, low-pressure cure stage of the process. Additional savings are possible from the use of the optional low-temperature consolidation of the laminate, and from cure of a free-standing, formed laminate structure in an oven. With optimal selection of the thermosettable resin system, it is possible to provide low-temperature consolidated laminates which can be stored at or near room temperature following consolidation and prior to cure of the laminate to the final composites structure. For example, a laminate prepared from a resin system comprising the diglycidyl ether of 9,9-bis(4-hydroxyphenyl)fluorene and $\alpha,\alpha'$-bis(3,5-dimethyl-4-aminophenyl)p-diisopropylbenzene curing agent can be consolidated by heating under vacuum and moderate pressure to a temperature of about 120° C. over about 1.5 hours, to impart to the consolidated laminate a partially-cured Tg substantially below the ultimate Tg. Laminates of this resin system can be fabricated by low-temperature, low-pressure cure in the glassy state (below the Tg) to provide a cured resin having an ultimate Tg of about 240° C.

EXAMPLE 1

An experiment was done to test the concept of low-temperature preparation of composite structures. An epoxy resin system made up of EPON HPT® Resin 1079, the diglycidyl ether of 9,9-bis(4-hydroxyphenyl)fluorene, and 25 weight percent, based on the weight of the system, of EPON HPT® Curing Agent 1061, $\alpha,\alpha'$-bis(4-aminophenyl)p-diisopropylbenzene.

A satin weave glass cloth prepreg was fabricated by hot melt processing. Two 4"×6" 15-ply laminates were prepared. The first was processed by a high-temperature composites fabrication process in which the laminate was heated, in an autoclave under full vacuum and a pressure of 80 psi, to 177° C. at a rate of 1.4° C. per minute and held for 2 hours. This pre-cure step was followed by a free-standing, oven cure at 204° C. for 4 hours. The resulting laminate appeared by observation to be void-free and structurally sound.

The second laminate was heated, in an autoclave under full vacuum and a pressure of 80 psi, from room temperature to 121° C. in one hour followed by a 0.5-hour hold. This laminate also appeared to be of good quality. The resin content of both laminates was 38%.

Dynamic mechanical properties of specimens cut from each laminate were determined in a Rheometrics Dynamic Mechanical Spectrometer (RDS). The heating rate for the first (high-temperature cured) laminate was 3° C. per minute to 170° C. and 1.5° per minute to 310° C. The ultimate Tg of this laminate was found to be 243° C., consistent with the Tg previously reported in the literature.

The second (partially-cured) laminate was heated at a rate of 3° C. per minute to about 140° C., at which point a slight decline in shear modulus was noted, indicating that the temperature of the partially-cured system was approaching its Tg. At this time, the heating rate was reduced to about 0.75° C. per minute, a rate selected to maintain the temperature of the system below its advancing Tg. Using this procedure, it was found that the shear modulus of the second laminate remained equal to or slightly higher than that of the first laminate well beyond the Tg for either sample, suggesting that cure of the second laminate was continuing in the glassy (solid) state. After the described treatment in the RDS, the second laminate showed, based on dynamic mechanical spectra, essentially the same Tg as the first laminate.

EXAMPLE 2

An experiment was done to test the concept of low-temperature preparation of composite structures prepared from a resin system having a slower cure rate than the resin system used in Example 1. (Accelerators were not used in either system.) An epoxy resin system made up of EPON HPT® Resin 1079, the diglycidyl ether of 9,9-bis(4-hydroxyphenyl)fluorene, and about 25 weight percent, based on the weight of the system, of EPON HPT® Curing Agent 1061, $\alpha,\alpha'$-bis(3,5-dimethyl-4-aminophenyl)p-diisopropylbenzene.

A satin weave glass cloth prepreg was fabricated by solution processing. Two 4"×6" 15-ply laminates were prepared. The first was processed in a high-temperature composites fabrication process in which the laminate was heated, in an autoclave under full vacuum and a pressure of 80 psi, to 177° C. at a rate of about 1.4° C. per minute and held for 1.5 hours. This laminate consolidation step was followed by a free-standing, oven cure at 232° C. for 4 hours. The resulting laminate appeared by observation to be void-free and structurally sound.

A second laminate was processed in a relatively low-temperature procedure by first heating, in an autoclave under full vacuum and a pressure of 80 psi, an identical laminate from room temperature to 121° C. in one hour followed by a 0.5-hour hold, to produce a partially-cured, consolidated laminate.

Dynamic mechanical properties of specimens cut from each laminate were determined by RDS. The heating rate for the first (high temperature consolidated, fully-cured) laminate was 0.5° C. per minute to 260° C. The ultimate Tg of this laminate was found to be 228° C.

A test specimen from the second laminate (low-temperature consolidated, partially-cured) was heated in the RDS at an average rate of about 3° C. per minute to about 140° C., at which point a slight decline in shear modulus was noted, indicating that the temperature of the partially-cured system was approaching its Tg.

The heating rate was then reduced to about 0.10° C./min, a rate selected to maintain the temperature of the system below its advancing Tg. Using this procedure, it was found that the shear modulus of the second laminate remained equal to or slightly higher than that of the first laminate beyond the Tg for either sample, suggesting that cure of the second laminate was continuing in the glassy (solid) state. The results of this test in the RDS were used to program the oven for cure of the remainder of the second laminate.

The second laminate was then placed in a temperature-programmable free-standing oven. The oven temperature was increased from room temperature to 104° C. over 30 minutes and held at this temperature for 48 minutes. The temperature was then increased in ramped stages at an average rate of about 0.10° C./min over about 22 hours. Physical properties of the fully-cured laminates are shown below in Table 1.

TABLE 1

|  | Laminate 1 | Laminate 2 |
| --- | --- | --- |
| Flex Strength, RT (ksi) | 73 | 73 |
| Modulus (msi) | 31 | 32 |
| Flex Strength, 300° F. (ksi) | 59 | 54 |
| Modulus (msi) | 27 | 27 |
| Short Beam Shear, RT (ksi) | 8.9 | 7.7 |
| Tg, °C. | 228 | 228 |

We claim:

1. A process for preparing a shaped thermoset composite article, the process comprising:
   (a) placing a shaped laminate comprising a fibrous reinforcing agent and a partially-cured thermosettable resin system into a temperature-programmable oven;
   (b) exposing said laminate, at a pressure less than about 50 psi, to an elevated temperature which elevated temperature increases over time, is sufficient to promote further cure of the resin system and to thereby increase the glass transition temperature thereof, and remains within about 20° C. below the advancing glass transition temperature of the thermosettable resin system; and
   (c) cooling the thus-treated laminate to room temperature.

2. The process of claim 1 in which the thermosettable resin system comprises an epoxy resin and a curing agent therefor.

3. The process of claim 1 in which the time of exposure of the laminate is sufficient to impart to the thermosettable resin its ultimate glass transition temperature.

4. The process of claim 3 in which the temperature of step (b) is increased at a rate of at least about 0.1° C. per minute.

5. The process of claim 1 in which the thermosettable resin comprises an imide resin.

6. The process of claim 1 in which the thermosettable resin comprises a diglycidyl ether of a bisphenol of fluorene.

7. The process of claim 1 in which the thermosettable resin comprises a glycidated aromatic amine.

8. The process of claim 1 in which step (b) is carried out at atmospheric pressure.

9. The process of claim 8 in which step (b) is carried out in a series of ramped heating stages.

10. The process of claim 1 in which the laminate is a free-standing formed structure.

11. The process of claim 6 in which the temperature of step (b) is increased at a rate within the range of about 0.1° to about 2° C. per minute.

12. The process of claim 11 in which the thermosettable resin system further comprises a cure accelerator.

13. The process of claim 1 in which the temperature of exposure of step (b) is within the range of about 2° to about 12° C. below the increasing glass transition temperature of the thermosettable resin system.

14. The process of claim 1 in which the time of exposure of the laminate according to step (b) is within the range of about one hour to about three hours.

15. The process of claim 1 which further comprises exposing, at atmospheric pressure, the laminate cured according to step (b) to a temperature at or near its ultimate glass transition temperature for a time of up to about ten hours.

16. A process for making a thermoset composite article, the process comprising:
   (a) exposing, under vacuum and at greater than atmospheric pressure, a laminate, which laminate comprises a plurality of prepregs each of which comprises a fibrous substrate and a thermosettable resin system having a glass transition temperature Tg, to an elevated temperature above Tg and sufficient to advance further curing of the thermosettable resin, thereby increasing the glass transition temperature thereof;
   (b) cooling the laminate to a temperature below the advanced Tg of the thus-treated thermosettable resin system;
   (c) exposing the thus-treated laminate, for a time sufficient to cure the resin system to its ultimate Tg and at a pressure less than about 50 psi, to an elevated temperature which increases over time and remains below the advancing glass transition temperature of the thermosettable resin system; and
   (d) cooling the thus-treated laminate to about room temperature.

17. The process of claim 16 in which the pressure of step (e) is about atmospheric pressure.

18. The process of claim 16 in which the temperature of exposure of step (e) is increased at a rate within the range of about 0.1° to about 2° C. per minute.

19. The process of claim 16 in which the temperature of step (e) is increased to an extent sufficient to impart to the thermosettable resin, its ultimate Tg.

20. The process of claim 16 in which the pressure of exposure of step (b) is less than about 100 psi.

21. The process of claim 20 in which the temperature of exposure of step (b) is within the range of about 75° to about 150° C.

22. The process of claim 16 in which the thermosettable resin comprises an epoxy resin.

23. The process of claim 16 in which the thermosettable resin comprises a bismaleimide resin.

24. The process of claim 22 in which the epoxy resin is a diglycidyl ether of a bisphenol of fluorene.

25. The process of claim 16 in which step (e) is carried out in a series of ramped heating stages.

26. The process of claim 16 in which the laminate is heated in step (e) as a free-standing formed structure.

* * * * *